US012651059B2

(12) United States Patent
Totale et al.

(10) Patent No.: US 12,651,059 B2
(45) Date of Patent: *Jun. 9, 2026

(54) METHODS AND SYSTEMS FOR TENANT AWARE BEHAVIOR INJECTION IN CONTENT METADATA SERVICE

(71) Applicant: OPEN TEXT CORPORATION, Waterloo (CA)

(72) Inventors: Sachin Gopaldas Totale, Pleasanton, CA (US); Harish Rawat, San Jose, CA (US)

(73) Assignee: OPEN TEXT CORPORATION, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 19/249,831

(22) Filed: Jun. 25, 2025

(65) Prior Publication Data

US 2025/0322063 A1 Oct. 16, 2025

Related U.S. Application Data

(63) Continuation of application No. 16/031,477, filed on Jul. 10, 2018, now Pat. No. 12,373,545.

(60) Provisional application No. 62/531,630, filed on Jul. 12, 2017.

(51) Int. Cl.
*G06F 21/53* (2013.01)
*H04L 9/40* (2022.01)

(52) U.S. Cl.
CPC .............. *G06F 21/53* (2013.01); *H04L 63/20* (2013.01); *G06F 2221/2149* (2013.01)

(58) Field of Classification Search
CPC ... G06F 21/53; G06F 2221/2149; H04L 63/20
USPC ........................................................... 705/50
See application file for complete search history.

(56) References Cited

U.S. PATENT DOCUMENTS

| | | | |
|---|---|---|---|
| 7,055,146 B1 * | 5/2006 | Durr | G06F 9/44521 |
| | | | 717/162 |
| 2012/0173589 A1 * | 7/2012 | Kwon | G06F 16/211 |
| | | | 707/E17.005 |
| 2014/0165135 A1 * | 6/2014 | Fitterer | G06F 21/53 |
| | | | 726/1 |
| 2017/0134388 A1 * | 5/2017 | Wood | G06F 16/113 |

* cited by examiner

*Primary Examiner* — Wodajo Getachew
(74) *Attorney, Agent, or Firm* — Sprinkle IP Law Group

(57) ABSTRACT

A system in which an event manager executes a multitenant computing platform. The event manager obtains a first domain-specific event indicating a user request to perform operations associated with a particular tenant's domain object. Information for the domain object associated with the domain-specific event is retrieved from a tenant database, the information including a domain object definition and instructions defining its behaviors. A protected event execution environment (sandbox) is generated on the multitenant computing platform implementing restrictions on execution of the domain object's behavior instructions. The restrictions are specific to the combination of the user and the domain object. Execution of the instructions is initiated in the protected event execution environment. A second domain-specific event which indicates a request to modify the domain object information is then obtained, and the modification of the domain object information is initiated in the protected event execution environment.

20 Claims, 4 Drawing Sheets

214

400

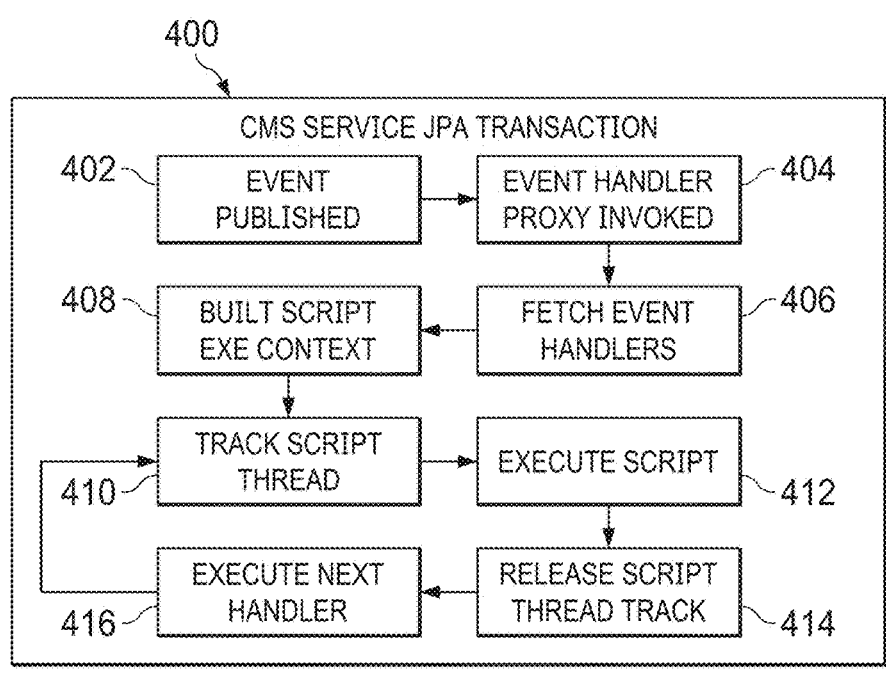

CMS SERVICE JPA TRANSACTION

402 — EVENT PUBLISHED → EVENT HANDLER PROXY INVOKED — 404

408 — BUILT SCRIPT EXE CONTEXT ← FETCH EVENT HANDLERS — 406

410 — TRACK SCRIPT THREAD → EXECUTE SCRIPT — 412

416 — EXECUTE NEXT HANDLER ← RELEASE SCRIPT THREAD TRACK — 414

FIG. 4

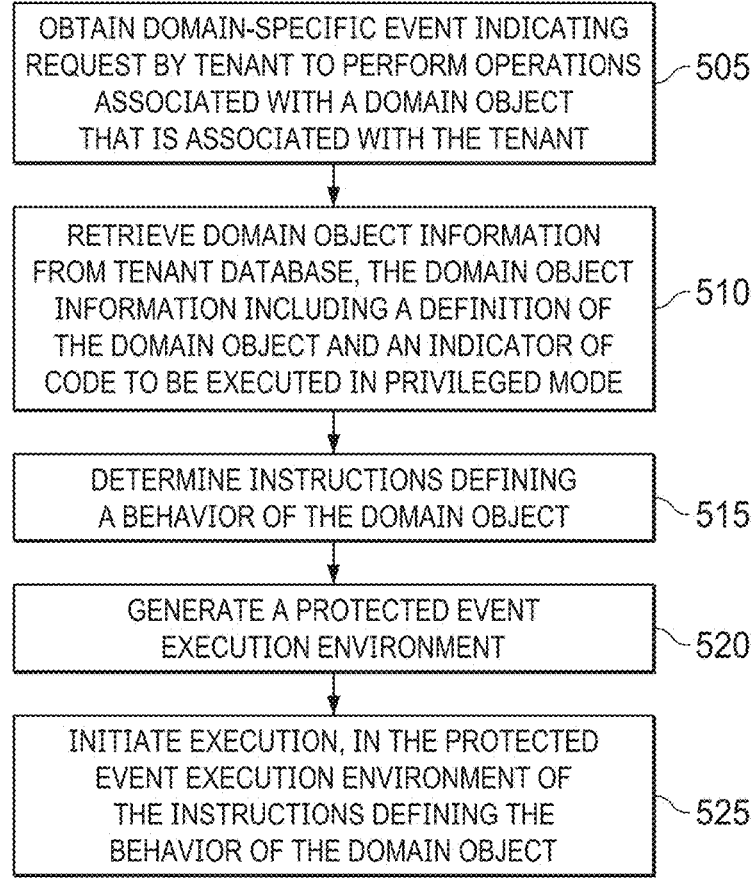

OBTAIN DOMAIN-SPECIFIC EVENT INDICATING REQUEST BY TENANT TO PERFORM OPERATIONS ASSOCIATED WITH A DOMAIN OBJECT THAT IS ASSOCIATED WITH THE TENANT — 505

RETRIEVE DOMAIN OBJECT INFORMATION FROM TENANT DATABASE, THE DOMAIN OBJECT INFORMATION INCLUDING A DEFINITION OF THE DOMAIN OBJECT AND AN INDICATOR OF CODE TO BE EXECUTED IN PRIVILEGED MODE — 510

DETERMINE INSTRUCTIONS DEFINING A BEHAVIOR OF THE DOMAIN OBJECT — 515

GENERATE A PROTECTED EVENT EXECUTION ENVIRONMENT — 520

INITIATE EXECUTION, IN THE PROTECTED EVENT EXECUTION ENVIRONMENT OF THE INSTRUCTIONS DEFINING THE BEHAVIOR OF THE DOMAIN OBJECT — 525

FIG. 5

605 — OBTAIN DOMAIN-SPECIFIC EVENT INDICATING REQUEST FROM DOMAIN ACCESS OBJECT TO MODIFY DOMAIN OBJECT INFORMATION ASSOCIATED WITH DOMAIN OBJECT IN THE TENANT DATABASE

610 — INITIATE MODIFICATION OF THE DOMAIN OBJECT INFORMATION ASSOCIATED WITH THE DOMAIN OBJECT IN THE TENANT DATABASE

METHODS AND SYSTEMS FOR TENANT AWARE BEHAVIOR INJECTION IN CONTENT METADATA SERVICE

CROSS-REFERENCE TO RELATED APPLICATIONS

This application is a continuation of, and claims a benefit of priority under 35 U.S.C. 120 of, U.S. patent application Ser. No. 16/031,477 filed Jul. 10, 2018, issued as U.S. Pat. No. 12,373,545, entitled "METHODS AND SYSTEMS FOR TENANT AWARE BEHAVIOR INJECTION IN CONTENT METADATA SERVICE," which claims a benefit of priority under 35 U.S.C. § 119 to U.S. Provisional Patent Application No. 62/531,630 filed Jul. 12, 2017, entitled "METHODS AND SYSTEMS FOR TENANT AWARE BEHAVIOR INJECTION IN CONTENT METADATA SERVICE", which are hereby expressly incorporated by reference for all purposes.

TECHNICAL FIELD

This disclosure relates generally to the field of content management systems. More particularly, this disclosure relates to the field of metadata management for content management systems.

BACKGROUND OF THE RELATED ART

Conventionally, users have run their custom code on their own premises, and thus, other computing systems external to the users' premises were not substantially affected by computing operations performed by the users. However, as users have moved toward cloud hosting for their computing operations (e.g., in a multitenancy environment), it may be possible that one tenant's operations may negatively affect a host and/or other tenants in the same environment.

Conventionally, domain objects may be defined by users with respect to their own domains within the multi-tenant environment. The users may further specify metadata associated with the domain objects. For example, in the case of a loan processing application, a user such as a bank may define domain objects such as loan applications, and may define attributes for the loan applications, such as the type of loan, the amount of the loan, the associated interest rate, etc.) There may be times, however, when simply being able to define metadata information for the domain objects is insufficient for a user's needs.

The user may therefore wish to execute custom code in connection with the domain objects. Because it may not be possible (or practical) for the host of the multi-tenant environment to verify each piece of custom code, execution of this code may have effects that adversely impact other tenants. For example, the custom code may use an inordinately large amount of processing or memory resources and may thereby reduce the performance of other tenants' applications.

SUMMARY OF THE DISCLOSURE

Embodiments disclosed herein can address the aforementioned drawbacks and provide additional technical solutions and benefits. One example aspect of the invention is to provide tenant-aware behavior injection in a content metadata service.

Embodiments disclosed herein provide new systems, methods, and computer program products for managing a content metadata service. In exemplary embodiments, a multitenant computing environment is provided, where code associated with instances of domain objects is executed in a protected event execution environment which allows the execution of code corresponding to one tenant to be isolated so that it does not negatively affect other tenants.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

In one embodiment, a system is implemented in a multitenant environment. The system includes at least one device processor and at least one non-transitory computer readable medium which stores instructions that are translatable by the processor to implement an event manager. The event manager executes a multitenant computing platform. Within this platform, the event manager obtains a first domain-specific event which indicates a request by a user to perform operations associated with a domain object, which itself is associated with a particular tenant of the multitenant computing platform. The event manager retrieves information for the domain object associated with the domain-specific event from a tenant database. This domain object information includes a definition of the domain object, and a set of instructions defining a behavior of the domain object. The event manager generates a protected event execution environment (which may be referred to as a "sandbox") on the multitenant computing platform which implements restrictions on execution of the instructions defining the behavior of the domain object. The restrictions are specific to the user and the domain object in combination. The event manager initiates execution of the instructions defining the behavior of the domain object in the protected event execution environment. A second domain-specific event which indicates a request from a domain access object to modify the domain object information is then obtained, and modification of the domain object information associated with the domain object in the tenant database is initiated in the protected event execution environment.

In one embodiment, APIs are provided to enable input from a client. For example, the first domain-specific event may be an event published by a corresponding domain access object, accessed by the user through a corresponding API, where the published event indicates that the domain object will be accessed. The second domain-specific event may be an event published by a corresponding domain access object accessed by the user through a corresponding API, where the published event indicates a modification, according to input provided by the user, of metadata associated with the domain object or code defining a behavior of the domain object. The domain object information may include a privilege mode value associated with the behavior of the domain object. When the privilege mode value has a first value, it indicates a non-privilege mode, so the event manager validates one or more associated conditions prior to executing the instructions that define the behavior of the domain object, but when it has a second value, this indicates a privilege mode in which the event manager executes the instructions without requiring prior validation of any associated conditions. In one embodiment, the event manager may obtain a third domain-specific event indicating a request to perform operations associated with domain object, where either the domain object or the user is different from those associated with the first and second domain-specific events. Because the combination of the domain object and the user is different, a different protected event execution environment (sandbox) is generated on the multi-tenant computing platform, wherein the second sandbox is isolated from the first. The instructions associated with the third domain-specific event are then executed in the second sandbox. In some embodiments, the instructions defining the behavior of the domain object include domain-specific logic defined by the tenant for the domain object. The system may include a validation module which obtains from the tenant trait information and behavior information associated with the domain object and requests validation of the obtained information. The trait information may define a subset of properties of the domain object, where the subset of properties are changed by operations associated with the behavior of the domain object. The system may provide APIs which receive input from the user indicating the operations that are to be performed with respect to the domain object, and enable access to domain access objects which are processed by the event manager to perform operations associated with the domain object.

Alternative embodiments may include methods and computer program products that perform the functions described above with respect to the system implemented in the multi-tenant environment.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 4 depicts a flow diagram illustrating an example of a CMS service JPA transaction according to some embodiments.

FIG. 5 depicts a flow chart illustrating an example of a method for processing a tenant request according to some embodiments.

DETAILED DESCRIPTION

Figure 1:
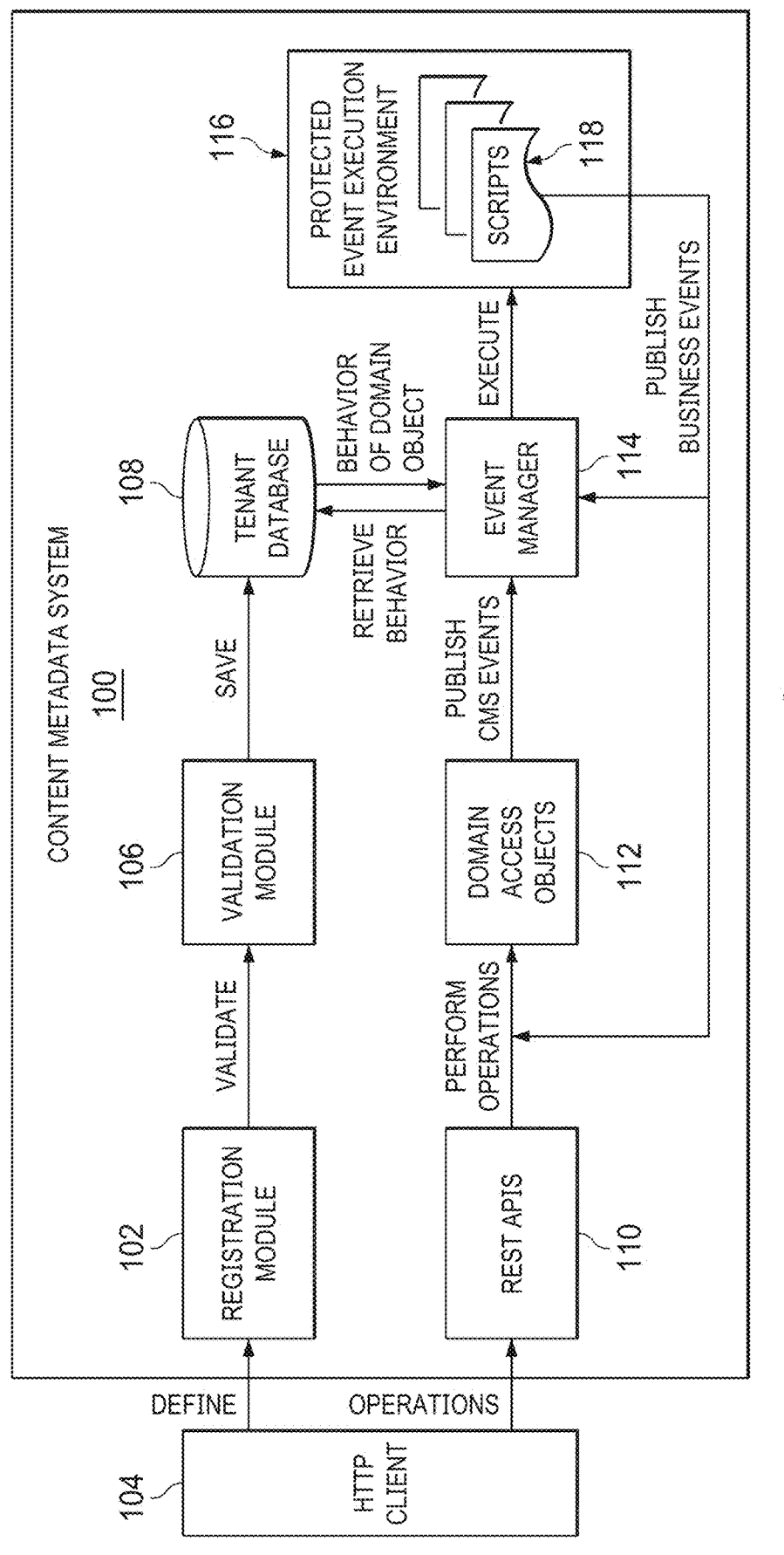
FIG. 1 depicts a block diagram illustrating one embodiment of a computing environment with a content metadata system according to some embodiments.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

In multi-tenant systems, applications can be used or built by various different users (tenants). A multi-tenant platform can, for example, host a loan processing application, a digital asset management application, or an image transformation application. The tenants of the platform can control their respective applications, adding users, defining domain objects associated with the application, and so on. Multiple entities may be involved with the different applications and the domain objects associated with the applications. For instance, in the example of a loan processing application, domain objects (e.g., loan applications) and metadata (e.g., attributes such as type of loan, amount of loan, interest rate, etc.) may be defined by users (e.g., banks), but simply having metadata information may not suffice for many of the users. It may be desirable for these users to define their own custom code for the "behavior" of a domain object. "Code", as used herein, refers to instructions, scripts or other executable programming that may be used to define the behavior of a domain object. Execution of this code or evaluation of complex conditions may complicate validation on the domain objects.

Using example techniques discussed herein, the hosting system of a platform for a multi-tenancy environment may support checking pre-conditions needed to run the domain object logic, and may run each event defined by a tenant's custom code in a protected event execution environment which isolates execution of the code and prevents interference of the code with that used by other tenants of the system, as well as preventing interference with the hosting system itself.

Example techniques discussed herein may also provide the ability to decide when to honor and when not to honor custom behavior (e.g., by attaching a Boolean condition expression to an event handler definition), thus providing conditional/filterable behavior.

Further, example techniques discussed herein may provide the ability to activate a privileged mode of behavior execution (e.g., allowing custom background behavior).

Further, example techniques discussed herein may provide an ability to trigger custom behavior only for a subset of property changes (e.g., using defined "traits," or groups of properties of domain objects).

Further, example techniques discussed herein may provide an ability to chain, link, or otherwise associate custom behavior for various life cycle events.

Example techniques discussed herein may advantageously allow a tenant to apply behavior to content and domain objects. For instance, the tenant may apply logic taking a FICO score for a loan application and injecting the FICO score into a credit report, redacting certain information from the credit report, and opening a portable document format (PDF) document in memory via an appropriate application programming interface (API) as an object. In some embodiments, nothing may be persisted in these operations.

One example platform discussed herein may be referred to as "LEAP". This refers to a suite of purpose-built, cloud-native software as a service (SaaS) content apps for content management and interactions. The LEAP platform may include software and hardware components necessary for providing a flexible micro-service architecture and easily consumable Representational State Transfer (REST) APIs that can integrate with existing systems. For example, the LEAP platform may expose services as API's with which users may build their own content applications.

On the LEAP platform, a tenant can subscribe to one or more applications and enable their users to perform their daily activities effectively across all applications in a consistent fashion. The applications are targeted to streamline and automate specific business use cases and provide a seamless experience for end-users.

The applications may, for example, enable enterprise content management (ECM) for users on top of their HR system, enable customers to manage their digital assets, and enable customers to manage their workflows.

These applications rely on sets of business entities, business rules, business operations, permission modeling, etc. The metadata associated the applications is managed by an object metadata microservice that may provide the application with capabilities such as business domain specific entity/type definitions, business domain specific permission modeling, business domain specific metadata structuring (e.g., case modeling or relationship modeling), and generic operations based on type categories. The generic operations may include operations for file object types (Create, Update, Delete, View, Checkout, Checking, Cancel Checkout, Move Copy, Download), for folder object type (Create, Update, Delete, View, Move Copy, Add Children), for business object type (Create, Update, Delete. View), and for Relation type (Relate, Update, Delete, View).

While the platform may provide a large number of operations for each entity type category, these generic operations do not suffice in the business domain in many use cases. There may be a number of reasons for this, such as: an operation may require additional input, apart from updated metadata of the candidate object; it may be necessary for a user to have additional/alternative permissions in order to perform an operation; the applicability of an operation may be based on a certain business context or condition; execution of an operation may impact multiple objects; and it may be necessary to translate an operation into a domain specific API. To address these concerns around out-of-the-box operations on the platform, a custom operation composition capability may be introduced around the available type definitions.

As a non-limiting example, a LEAP capture service may enable users to embed advanced document and data capture capabilities into custom applications. The capture service may provide capture capabilities such as real-time automatic document classification and data extraction, image enhancement/processing, barcode recognition, full-text searchable PDF creation, etc.

As another example, a LEAP content service may allow users to build enterprise content applications in the cloud with a rich set of capabilities that may include file uploads/downloads, versioning, folders, metadata attributes, content transformation, workflow processes, enterprise search, etc. The content service may also include administration APIs for running applications, including authentication, user and role management.

As yet another example, a LEAP case service may provide case creation, collaboration and export to support integrated solutions and embedding key features and functionality of applications (e.g., a Courier application) into third-party applications.

FIG. 1 depicts a block diagram illustrating one embodiment of a computing environment with a content metadata system (CMS) 100 according to some embodiments. In the example illustrated, CMS 100 may include a registration module 102 that receives information from a user 104 (e.g., a Hypertext Transfer Protocol (HTTP) client running on a computing device communicatively connected to CMS 100, referred to herein as "client"). For example, client 104 may be a client of a service (e.g., a tenant in a multitenant environment hosted in the cloud). In an on-boarding phase (e.g., new user/tenant), client 104 may provide information regarding domain objects that are specific to client 104. As used herein, a "domain" can be specific to a specific tenant (e.g., client 104), and a "domain object" may include a business object (or other object) that can be specific to the tenant associated with the domain.

In the example of FIG. 1, client 104 may provide information regarding domain objects so that registration module 102 may register the information. Registration module 102 may register user input such as domain object traits and domain object behaviors. A domain object "trait" may, for example, include a set of properties or attributes of the domain object. Domain object "behavior" refers to logic (e.g., code, scripts, instructions, etc.) that is domain-specific logic. In other words, the logic is provided by the tenant associated with the domain. In this context, "domain-specific" refers to being associated with a specific tenant domain and being applicable only to that specific domain.

As shown in FIG. 1, a validation module 106 may compile and instrument the domain object behaviors, as part of validation of the domain object behaviors. As part of the validation, instructions (e.g., code, scripts, etc.) associated with the domain objects may be checked for potential coding/execution issues (e.g., potential infinite loops, potential infinite calls, code that is not authorized by the host/provider). Instrumenting the domain object behaviors involves modifying the behaviors (e.g., by injecting code) to perform such functions as making the behaviors more efficient, providing information on the behaviors' execution, and enforcing restrictions on their execution. Once validated, the instructions (e.g., behavior code) may be converted to compiled code. For example, potential issues may be removed/blocked, the code may be instrumented, and the instructions may be converted to byte code.

In one embodiment, validation module 106 may determine when to honor and when not to honor custom behavior (e.g., by attaching a Boolean condition expression to a domain-specific event handler definition), thus providing conditional/filterable behavior. The user input may include indicators for activation of "privilege mode" (or non-privilege mode) for execution of certain behavior logic. These indicators may be flags, bits, or other means to indicate whether the behavior logic should be run in a privileged mode or a non-privileged mode. The privileged mode is a mode in which the logic can be run without first obtaining user authorization or determining whether preconditions have been met, since the logic has already been validated. Validation module 106 may process the input to identify the behavior logic and verify that the logic is validated for execution in the privileged mode (for activation during execution). Then, a privilege mode parameter can be used to store a value indicating whether or not the privileged mode is to be activated when the logic is executed. This ability may allow custom background behavior, as defined by the tenant.

In some embodiments, the user input may include indicators for trait (property groups) level triggers. Thus, validation module 106 may process the user input to identify the behavior logic for triggering custom behavior only for a subset of property changes.

Validation module 106 may also identify custom behavior that may be chained for various lifecycle events. The chained behaviors may trigger each other so that they are executed one after another. For example, the input business logic may be converted into multiple scripts which may be chained to lifecycle events. In one embodiment, Nashorn (e.g., a JavaScript engine) may be used to process the scripts and convert them to byte code. For example, a Java Virtual Machine (JVM) may be used for sandboxing (e.g., Nashorn). For example, Nashorn may input tenant JavaScript and create Java classes on the fly, which may be included in the JVM for sandboxing. For example, a current version of Nashorn may provide an ability to prevent sandboxed users from accessing information via a network, while allowing such users to access APIs. One skilled in the art of computing will understand there are numerous other computer languages that may be used by the tenants, as well as by the hosting system, to implement the requested logic.

In some embodiments, a tenant (user) may provide one or more scripts defining domain object behaviors. As discussed above, the scripts may be written using JavaScript language.

As a non-limiting example, as part of instrumentation, if the tenant-provided instructions include an instruction to log data to the system (e.g., "log.out"), validation module 106 may transform the code to perform the logging in a controlled fashion, so that the log operation is not made to a system log of the provider/host (or to another tenant in the multitenant environment). As another example, as part of the instrumentation, if the tenant-provided instructions include a substantial amount of "white spaces," these may be removed, to avoid consuming substantial memory. As another example, as part of the instrumentation, if the tenant-provided instructions include some logic (e.g., business logic such as validation logic) that may consume a substantial amount of memory and/or CPU time for execution, validation module 106 may inject instructions into the code to provide a benchmark, to interrupt or stop execution, to provide more efficient execution on the provider/host system. For example, the injected instructions may provide one or more optimizations for execution of the tenant logic.

In some embodiments, script compilation and instrumentation may include compiling JavaScript code, to validate the syntax, and scanning and instrumenting the code for potential issues. For example, the code may be checked for system injected APIs that may override, for example, monitorService, AclService, FileService, FolderService, ItemService, JsCallbackService, QueryService, RenditionService, TraitService, or EventService. For example, if any overriding attempts for such APIs are found, validation module 106 may forbid the script injection into the system and report an error condition. For example, validation module 106 may add hooks to terminate script execution for determined conditions such as infinite loops, infinite recursions, long running code, and consumption of resources (e.g., CPU, memory) beyond a permitted limit. As another example, validation module 106 may add an empty implementation for prohibited inbuilt JavaScript APIs, such as load, exit/quit, setTimeout, console, print, echo, readFully, readLine, or loadWithNewGlobal.

In some embodiments, an example trait definition may be used as shown in the following sample code segment:

```
{
    "name": "loan",
    "displayName": "Loan",
    "attributes": [{
        "name": "firstname",
        "dataType": "string",
        "size": 100,
        "displayName": "First Name"
    },
    {
        "name": "lastname",
        "dataType": "string",
        "size": 100,
        "displayName": "Last Name"
    },
    {
        "name": "addressLine1",
        "dataType": "string",
        "displayName": "Address Line 1"
    },  {
        "name": "addressLine2",
        "dataType": "string",
        "displayName": "Address Line 2"
    },
    {
        "name": "city",
        "dataType": "string",
        "displayName": "City"
    },
```

-continued

```
{
    "name": "state",
    "dataType": "string",
    "displayName": "State"
},
{
    "name": "zipcode",
    "dataType": "string",
    "displayName": "Zip Code"
},
{
    "name": "loanAmount",
    "dataType": "double",
    "repeating": "false",
    "displayName": "Loan Amount"
},
{
    "name": "loanTerm",
    "dataType": "integer",
    "displayName": "Loan Term"
}
],
"privileged":false,
"methods":["beforeSave", "afterSave","beforeUpdate", "afterUpdate"],
"preCondition":"newObject.traits.employee[founder].firstName = 'Sam'",
            "springExpr":"${newObject.traits.employee.name} = 'founder' &&
        ${newObject.traits.employee.firstName} = 'Sam'"
"script":["var beforeSave = function(context) {" ,
            "    context.debug('Got call in beforeSave of Loan Trait for item :
        '+context.getItem( ).getName( ));" ,
"};" ,
"var afterSave = function(context) {" ,
            "    context.debug('Got call in afterSave of Loan Trait for item :
        '+context.getItem( ).getName( ));" ,
"var beforeUpdate = function(context) {" ,
                "    context.debug('Got call in beforeUpdate of Loan Trait for
        item :'+context.getItem( ).getName( ));" ,
"};" ,
"var afterUpdate = function(context) {" ,
            "    context.debug('Got call in beforeUpdate of Loan Trait for item :
        '+context.getItem( ).getName( ));" ,
"};" ,
"var beforeTraitAttach = function(context) {" ,
            "    context.debug('Got call in beforeTraitAttach of Loan Trait for item :
        '+context.getItem( ).getName( ));" ,
"};" ,
"var afterTraitAttach = function(context) {" ,
            "    context.debug('Got call in afterTraitAttach of Loan Trait for item :
        '+context.getItem( ).getName( ));" ,
"};" ,
"var beforeTraitDetach = function(context) {" ,
            "    context.debug('Got call in beforeTraitDetach of Loan Trait for item :
        '+context.getItem( ).getName( ));" ,
"};" ,
"var afterTraitDetach = function(context) {" ,
            "    context.debug('Got call in afterTraitDetach of Loan Trait for item :
        '+context.getItem( ).getName( ));" ,
"};" ,
"var beforeTraitUpdate = function(context) {" ,
            "    context.debug('Got call in beforeTraitUpdate of Loan Trait for item :
        '+context.getItem( ).getName( ));" ,
"};" ,
"var afterTraitUpdate = function(context) {" ,
            "    context.debug('Got call in afterTraitUpdate of Loan Trait for item :
        '+context.getItem( ).getName( ));" ,
"};"]
}
```

As shown in the example code segment above, the code includes an indicator indicating that the code is not to be run in privileged mode. In this example, the indicator is an attribute having a logical value ("privileged":false), but it may be implemented in various other ways in alternative embodiments. For instance, the indicator may include a "privileged" parameter with a value stored for the parameter.

The compiled code may be stored in a tenant database 108 that can be specific to a tenant (e.g., client 104), under a definition that can be specified by the tenant. Tenant database 108 stores at least all of the domain type definitions for the tenant, as well as run-time objects. These may be stored, for example, in tables in tenant database 108 (e.g., as domain-specific event handlers, or behavior tables). Such a table may, for instance, include information identifying domain type behavior, information identifying original behavior scripts, instrumentor scripts, identifications of pre-conditions, indicators of whether code may run in privileged mode, or non-privileged mode, any priorities associated with the privileged/non-privileged modes, etc.). In some embodiments, with regard to the privileged mode information, if multiple script behaviors may be applicable for the same trait, and/or may need to be executed for one or more particular conditions, information in the table may identify any necessary ordering of script execution for particular conditions, including identifying the conditions and associated scripts (e.g., defining one or more priorities of script execution).

In the example shown in FIG. 1, each separate tenant can be associated with a tenant database that can be separate from every other tenant's database, such that no database information is shared between tenants in this embodiment. Each tenant's database includes tables that are unique to that tenant.

As shown in FIG. 1, client 104 may use a Representational State Transfer (REST) application program interface (API) 110 to request operations to be performed. For example, client 104 may request creation of a loan application via REST API 110. As part of performing the operations, at least one Domain Access Object (DAO) can be accessed from DAO storage 112. In one embodiment, every operation may be represented by one or more lifecycle events. Some of the domain-specific events in the creation of a loan application may be sequentially triggered. In one example, a first lifecycle event may occur before the loan application can be created. For example, there may be one or more pre-conditions for loan creation. There may be other lifecycle events that occur after loan creation (e.g., as a post-condition for loan creation), upon a change of a loan property, or before a loan applicant property can be changed. DAOs 112 are responsible for validating corresponding information, such as metadata that is associated with the loan. After the information is validated, DAOs 112 may create a loan application and store the loan in tenant database 108. As part of their processing, DAOs 112 may publish events such as CMS events to an event manager 114. For example, DAOs 112 may publish a domain-specific event indicating that a loan application will be created (i.e., before creation), a domain-specific event indicating that a loan application has been created (i.e., after creation), a domain-specific event indicating that a trait has been added or removed, etc. Such domain-specific events may be published by DAOs 112, and the domain-specific events may be subscribed by event manager 114.

Event manager 114 may be configured to check, for a particular domain-specific event or trait, whether there has been any behavior domain logic defined by the tenant associated with the domain. If so, event manager 114 may execute the associated behavior domain logic in a protected event execution environment 116. In one embodiment, all events associated with a particular domain object and a particular user are executed in the same protected event execution environment. The execution of these events in the protected event execution environment associated with the particular combination of user and domain object isolates the execution of the events and prevents them from adversely impacting the underlying platform and the other tenants that may be resident on the platform.

Event manager 114 may create protected event execution environment 116, and provide scripts 118 (e.g., instrumented code) for execution by protected event execution environment 116. Protected event execution environment 116 may be created and executed on a computing device of the platform hosting CMS 100. Event manager 114 may determine whether there is additional information needed (e.g., for a particular loan application), and may obtain and provide that information as needed. In protected event execution environment 116, as a script 118 is executed, script 118 may publish additional events, which may be subscribed by event manager 114 and/or DAOs 112. For example, script 118 may publish business events to event manager 114.

In the example of FIG. 1, multiple domain-specific events may be chained. In creation of a loan application, for example, before the loan application is created, a script for validating the loan application may be executed (e.g., as a pre-condition to creation of the loan application). Associated events may then be published by scripts 118, which may be provided to event manager 114. If there is any behavior associated with these events that has been defined by the tenant, event manager 114 may retrieve the behavior from tenant database 108, so that it may be executed. By use of chaining, multiple scripts may be used, and may be executed one after another (i.e., in sequence), by virtue of publishing multiple domain-specific events internally.

For this example, after creation of the loan application, the created loan application may be processed, and/or additional metadata may be created. Additionally, it may be possible to update information associated with the loan application (e.g., update a credit report).

As part of execution in protected event execution environment 116, if additional information is requested (e.g., as part of processing the loan application), the information may be obtained and provided to the processing script. For example, if information relating to an interest rate for a loan application is desired, the script may issue a call to tenant database 108, via an API provided by CMS 100, to obtain the additional information. Thus, during the sandboxed execution in the protected event execution environment, a script 118 may, for instance, request additional information, create more information, request that a document be obtained by the host system (e.g., a credit report), update a document (e.g., update a credit report), and/or request that an updated document be stored in tenant database 108 (e.g., store the updated credit report).

An external call may also be requested to, e.g., obtain a credit report. Event manager 114 may publish various events to external systems, and may receive the outputs of such events.

New metadata may also be obtained (e.g., a FICO® score), and the credit report may be updated with the new metadata. Further, certain information in the credit report (e.g., a pdf document) may be redacted, or presented to a user without the certain "redacted" information. As shown in the example of FIG. 1, scripts 118 do not communicate directly with the tenant database. Script processing can be performed in memory (a memory in the computing device hosting the protected event execution environment, and the hosting platform), and information is not persisted, except via APIs provided by the system. For example, an API can be provided as part of the sandboxing, so that scripts 118 may access DAOs 112, which may initiate updates to tenant database 108 (e.g., for persistent storage of the updates). For example, if a script executing in protected event execution environment 116 determines that a loan application is valid, then it may create additional metadata for tenant database 108, and may publish a domain-specific event to DAOs 112 for updating tenant database 108.

Thus, CMS 100 may provide controlled access to tenant database 108, as well as provide isolation to the executing scripts, thus providing protection (from the executing scripts) for other tenants, as well as for the host system. The controlled access may include applying policies, permissions, etc. to scripts 118 so that scripts 118 may not have direct access to tenant database 108 to update any information (i.e., scripts 118 are isolated from tenant database 108). As shown in FIG. 1, DAOs 112 and event manager 114 handle events in CMS 100. For example, domain-specific events involving updates/changes are published and updates may be processed at a later time.

Figure 2:
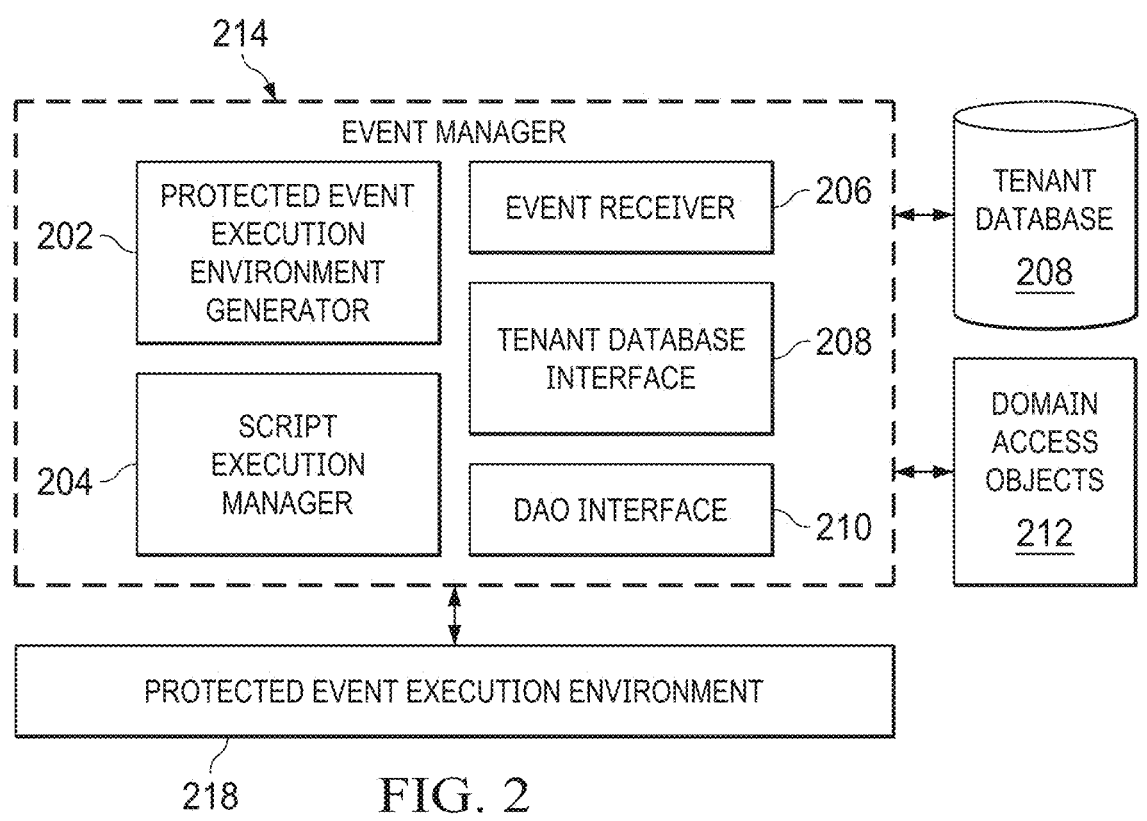
FIG. 2 depicts a diagrammatic representation of an example event manager according to some embodiments.

FIG. 2 depicts a diagrammatic representation of one embodiment of an event manager 114. Event manager 214 can comprise various modules to process events in CMS 100. For example, a protected event execution environment generation module 202 may generate a protected event execution environment 218 and a script execution manager 204 may initiate execution of scripts in protected event execution environment 218. As another example, an event receiver module 206 may obtain events for processing (e.g., domain-specific events, events subscribed by the event manager 214, etc.). In some embodiments, a tenant database interface module 208 may provide an interface between the event manager 214 and tenant database 208. A DAO interface module 210 may provide an interface between the event manager 214 and the domain access objects 212.

Figure 3:
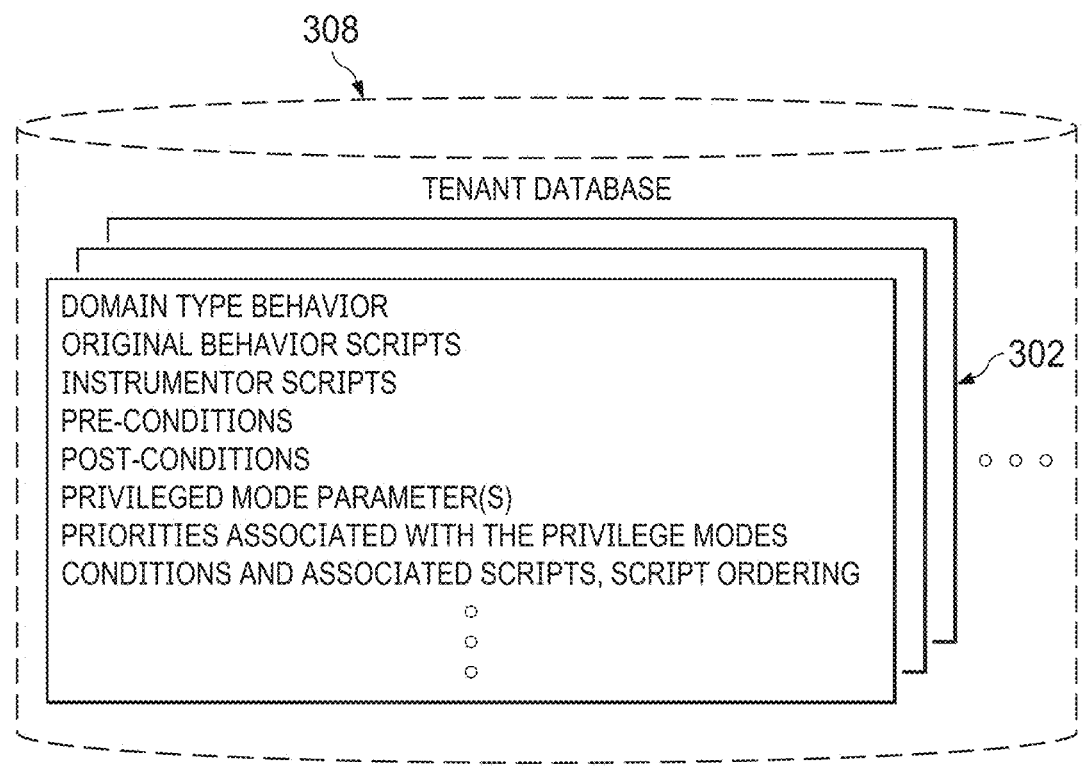
FIG. 3 depicts a diagrammatic representation of an example tenant database according to some embodiments.

FIG. 3 depicts a diagrammatic representation of one embodiment of a tenant database 108. As shown in FIG. 3, tenant database 308 may store a plurality of entities (e.g., tables) 302 that can persistently store information associated with domain objects (e.g., domain type definitions, metadata, domain object behavior, run-time objects, etc.). As shown in FIG. 3, table 302 may store information associated with a domain object, the information including, at least information identifying domain type behavior, information identifying original behavior scripts, instrumentor scripts, identifications of pre-conditions, indicators of whether code may run in privileged mode, or non-privileged mode, any priorities associated with the privileged/non-privileged modes, etc.). For example, with regard to the privileged mode information, if multiple script behaviors may be applicable for the same trait, and/or may need to be executed for one or more particular conditions, information in the table may identify any ordering of script execution for particular conditions, including identifying the conditions and associated scripts (e.g., defining one or more priorities of script execution, etc.).

FIG. 4 depicts a flow diagram illustrating an example of a CMS service Java Persistence API transaction 400 performed by a content management system (e.g., CMS 100) according to some embodiments. (JPA refers to a standard for Java object-relational mapping that specifies a set of annotations and an interface-EntityManager-to perform persistence operations with the mapped objects.) In the example illustrated, at 402, an event is published. At 404, an event handler proxy is invoked. At 406, event handlers are fetched. At 408, a script execution context is built. At 410, a script thread is tracked. At 412, the script is executed. At 414, a script thread track is released. At 416, a next event handler is executed.

FIG. 5 depicts a flow chart illustrating an example of a method for processing a tenant request by a content management system (e.g., CMS 100) according to some embodiments. In the example shown in FIG. 5, at 505, a domain-specific event indicating a request by a tenant to perform one or more operations associated with a domain object that is associated with the tenant may be obtained. At 510, domain object information may be retrieved from a tenant database, the domain object information including a definition of the domain object and an indicator of code to be executed in privileged mode. At 515, instructions defining a behavior of the domain object may be determined. At 520, a protected event execution environment may be generated. At 525, in the protected event execution environment, execution of the plurality of instructions defining the behavior of the domain object may be initiated.

Figure 6:
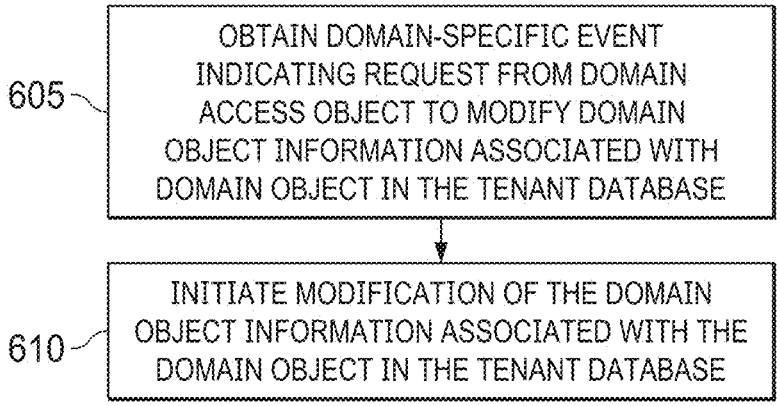
FIG. 6 depicts a flow chart illustrating an example of a method for processing tenant input information according to some embodiments.

FIG. 6 depicts a flow chart illustrating an example of a method for processing tenant input information by a content management system (e.g., CMS 100), according to some embodiments. In the example shown in FIG. 6, at 605, a domain-specific event indicating a request from a domain access object to modify domain object information associated with a domain object in the tenant database may be obtained. At 610, modification of the domain object information associated with the domain object in the tenant database may be initiated.

In one example, the method of FIG. 6 may be performed with respect to the same domain object and user as in the method of FIG. 5. In this instance, the first domain-specific event causes a protected event execution environment to be generated, where the instructions defining the behavior of the domain object are executed in the protected event execution environment. When this is followed by the method of FIG. 6, where the domain object and user are the same as in FIG. 5, the modification of the domain object according to FIG. 6 is performed in the same protected event execution environment as generated in FIG. 5.

As a non-limiting example, behavior injection may be used for data synthesizing. For example, a Document Number (DN) field may be calculated based on an expression which takes into account, the Origin Code (OC), Discipline Code (DC), Location Code (LC), and a sequence number (SN) (which may be automatically generated). As another example, behavior injection may be used for data validation (e.g., loan application validation). As yet another example, behavior injection may be used for data protection (e.g., allowing/disallowing manipulation of data based on business requirement—e.g., Courier cases can have rule to disallow movement of case nodes across cases). For example, on approving a loan, change the loan application permission (ACL) may be changed to "read only."

In some embodiments, behavior injection may be used for data management (e.g., add a business specific trait instance or create/move/delete object based on business rules). As another example, behavior injection may be used for business event invocation (e.g., case related events, loan related events, etc.).

As discussed above, "behavior" refers to domain object logic that can be provided by tenants and is domain-specific. Using example techniques discussed herein, when a tenant comes onboard a hosting platform in the multitenant environment, they define domain object types and domain object logic associated therewith. As discussed above, injection of domain object logic occurs at an onboarding phase. The domain object logic may be upgraded as needed (e.g., via versioning of the domain types).

As previously mentioned, custom operations may be defined along with type definitions. In one embodiment, each custom operation has metadata including a name, a description, a link relationship name (for the REST endpoint), and an HTTP method (e.g., GET/POST/PUT/PATCH). The custom operation may have custom metadata. A boolean indicator may be used to indicate that the input payload for the custom operation would have additional payload which is specific for the associated operation. Similarly, a boolean indicator may be used to indicate whether the input payload for custom operation can have (or may even require) an updated object payload. The custom operation may have a list of permits required for the object in order for a user to perform the associated operation. Sometimes, it may be desirable for a business operation to require a user to have specific permits on the parent of the affected object. The operation script (the executable portion of the custom operation) may have precondition and execute functions, where the precondition function returns true/false to indicate whether the operation is applicable or not, and the execute function provides core logic for the custom operation. These custom operations allow a tenant to create custom endpoints for accessing the domain objects, so that a user may require specific authorizations, or specified preconditions may have to be met, in order for the user to interact with the domain object.

When a custom operation is applied to an object instance, a response for that object instance could have a link relationship and URL pointing to the custom operation. Accessing the URL with an appropriate HTTP method and payload would trigger the execution of the custom operation on the platform.

In one example, a custom operation may be implemented in a loan application object type, where the custom operation is for approving the loan application. The metadata for the custom operation may be as follows:

```
Name: Approve_loan_application
Title: Approve Loan Application
Description: This operation allows the user to
approve the loan application
Link Relationship Name: Approve
HTTP Method: PUT
Require Updated Object Payload: False
Has Custom Payload: True
Require Object Permit: WRITE
Script: Function precondition( ) {
    var loanApplication = context.existingObject;
    if (loanApplication.status == 'REVIEWED') {
    return true;
    }
    return false;
    }
    Function execute( ) {
    var loanApplication = context.existingObject;
    loanApplication.status = 'APPROVED';
    loadApplication.save( );
    }
```

Embodiments disclosed herein can provide many advantages. For example, a tenant's custom code may be sandboxed (i.e., the custom code is executed in the protected event execution environment) so it does not affect other tenants or the underlying multitenant platform. In other words, these embodiments have the technical effect of isolating execution of the custom code within the protected event execution environment, which prevents the custom code from using an inordinately large amount of processing or memory resources and reducing the performance of other tenants' applications. This improves the security and protection of the multitenant platform, as well as tenant systems operating on the multitenant platform, while allowing each tenant to fully utilize their own custom code on the multitenant platform.

Figure 7:
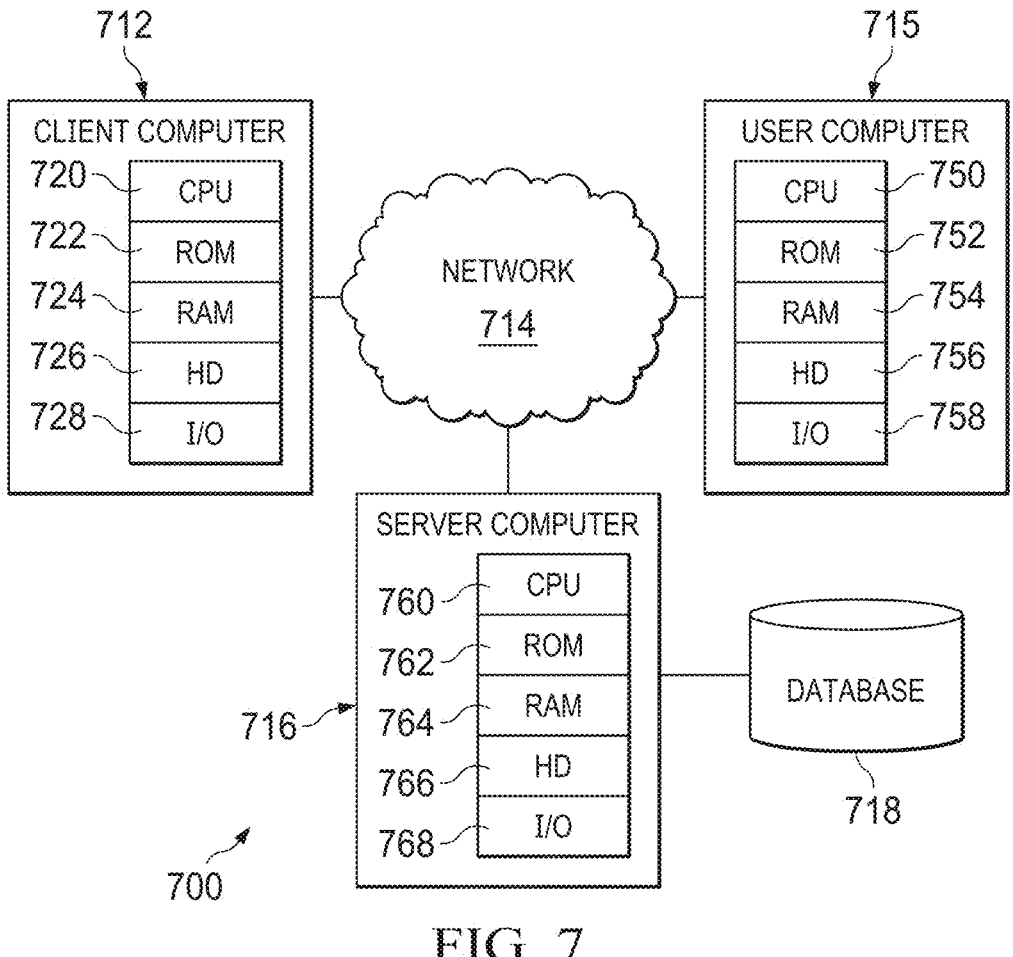
FIG. 7 depicts a diagrammatic representation of a distributed network computing environment where embodiments disclosed can be implemented.

FIG. 7 depicts a diagrammatic representation of a distributed network computing environment where embodiments disclosed can be implemented. In the example illustrated, network computing environment 700 includes network 714 that can be bi-directionally coupled to computer 712, computer 715, and computer 716. Computer 716 can be bi-directionally coupled to data store 718. Network 714 may represent a combination of wired and wireless networks that network computing environment 700 may utilize for various types of network communications known to those skilled in the art.

For the purpose of illustration, a single system is shown for each of computer 712, computer 715, and computer 716. However, with each of computer 712, computer 715, and computer 716, a plurality of computers (not shown) may be interconnected to each other over network 714. For example, a plurality of computers 712 and a plurality of computers 715 may be coupled to network 714. Computers 712 may include data processing systems for communicating with computer 716. Computers 715 may include data processing systems for individuals whose jobs may require them to configure services used by computers 712 in network computing environment 700.

First enterprise computer 712 can include central processing unit ("CPU") 720, read-only memory ("ROM") 722, random access memory ("RAM") 724, hard drive ("HD") or storage memory 726, and input/output device(s) ("I/O") 728. I/O 729 can include a keyboard, monitor, printer, electronic pointing device (e.g., mouse, trackball, stylus, etc.), or the like. Computer 712 can include a desktop computer, a laptop computer, a personal digital assistant, a cellular phone, or nearly any device capable of communicating over a network. Computer 715 may be similar to computer 712 and can comprise CPU 750, ROM 752, RAM 754, HD 756, and I/O 758.

Likewise, computer 716 may include CPU 760, ROM 762, RAM 764, HD 766, and I/O 768. Computer 716 may include one or more backend systems configured for providing a variety of services to computers 712 over network 714. These services may utilize data stored in data store 718. Many other alternative configurations are possible and known to skilled artisans.

Each of the computers in FIG. 7 may have more than one CPU, ROM, RAM, HD, I/O, or other hardware components. For the sake of brevity, each computer is illustrated as having one of each of the hardware components, even if more than one is used. Each of computers 712, 715, and 716 is an example of a data processing system. ROM 722, 752, and 762; RAM 724, 754, and 764; HD 726, 756, and 766; and data store 718 can include media that can be read by CPU 720, 750, or 760. Therefore, these types of memories include non-transitory computer-readable storage media. These memories may be internal or external to computers 712, 715, or 716.

Portions of the methods described herein may be implemented in suitable software code that may reside within ROM 722, 752, or 762; RAM 724, 754, or 764; or HD 726, 756, or 766. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or sub-routines may, for example, be stored or distributed on computer-readable media, including magnetic and optically readable and removable computer discs, stored as firmware in chips, as well as distributed electronically over the Internet or over other networks (including wireless net-works). Example chips may include Electrically Erasable Programmable Read-Only Memory (EEPROM) chips. Embodiments discussed herein can be implemented in suit-able instructions that may reside on a non-transitory com-puter readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combi-nation thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy dis-kette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-execut-able instructions may be stored as software code compo-nents on a direct access storage device array, magnetic tape, floppy diskette, optical storage device, or other appropriate computer-readable medium or storage device.

Any suitable programming language can be used to implement the routines, methods or programs of embodi-ments of the invention described herein, including C, C++, Java, JavaScript, HTML, or any other programming or scripting code, etc. Other software/hardware/network archi-tectures may be used. For example, the functions of the disclosed embodiments may be implemented on one com-puter or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combi-nation thereof.

Embodiments described herein can be implemented in the form of control logic in software or hardware or a combi-nation of both. The control logic may be stored in an information storage medium, such as a computer-readable medium, as a plurality of instructions adapted to direct an information processing device to perform a set of steps disclosed in the various embodiments. Based on the disclo-sure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be imple-mented by using software programming or code in one or more digital computers, by using application specific inte-grated circuits, programmable logic devices, field program-mable gate arrays, optical, chemical, biological, quantum or nanoengineered systems, components and mechanisms may be used. The functions of the invention can be achieved by distributed or networked systems. Communication or trans-fer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The com-puter readable medium can be, by way of example only but not by limitation, an electronic, magnetic, optical, electro-magnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appro-priate computer memories and data storage devices. In an illustrative embodiment, some or all of the software com-ponents may reside on a single server computer or on any combination of separate server computers. As one skilled in the art can appreciate, a computer program product imple-menting an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a central processing unit, multiple processing units, dedicated circuitry for achieving functionality, or other systems. Processing need not be limited to a geographic location or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the present disclosure should be determined by the following claims and their legal equivalents.

What is claimed is:

1. A system in a multitenant environment, the system comprising:
   at least one device processor; and
   at least one non-transitory computer readable medium storing instructions translatable by the at least one processor to implement an event manager, the event manager performing:
      obtaining a first domain-specific event indicating a request by a user to perform one or more operations associated with a domain object that is associated with a tenant of the multitenant computing platform;
      determining from domain object information a plurality of instructions defining a behavior of the domain object associated with the domain-specific event;
      generating a protected event execution environment on the multitenant computing platform which implements restrictions on execution of the plurality of instructions defining the behavior of the domain object, wherein the restrictions are specific to the user and the domain object in combination;

initiating execution, in the protected event execution environment, of the plurality of instructions defining the behavior of the domain object;
      obtaining a second domain-specific event indicating a request from a domain access object to modify the domain object information associated with the domain object in a tenant database; and
      initiating modification of the domain object information associated with the domain object in the tenant database in the protected event execution environment.

2. The system of claim 1, wherein the first domain-specific event comprises a first event published by a corresponding first domain access object that is accessed by the user through a corresponding application programming interface (API), wherein a published event indicates that the domain object will be accessed.

3. The system of claim 2, wherein the second domain-specific event comprises a second event published by a corresponding second domain access object that is accessed by the user through a corresponding API, wherein the published event indicates a modification of metadata associated with the domain object according to input provided by the user.

4. The system of claim 2, wherein the second domain-specific event comprises a second event published by a corresponding second domain access object that is accessed by the user through a corresponding API, wherein the published event indicates a modification of code defining a behavior of the domain object according to input provided by the user.

5. The system of claim 1,
   wherein the domain object information includes a privilege mode value associated with the behavior of the domain object,
   wherein when the privilege mode value is a first value indicating a non-privilege mode, the event manager validates one or more associated conditions prior to executing the plurality of instructions defining the behavior of the domain object, and
   wherein when the privilege mode value is a second value indicating a privilege mode, the event manager executes the plurality of instructions defining the behavior of the domain object without requiring prior validation of any associated conditions.

6. The system of claim 1, wherein the user comprises a first user, the domain object comprises a first domain object, and the protected event execution environment comprises a first protected event execution environment, wherein the event manager further performs:
   obtaining a third domain-specific event, wherein the third domain-specific event indicates a request to perform one or more operations associated with at least one of: a second user, and a second domain object;
   retrieving domain object information for a domain object associated with the third domain-specific event;
   generating a second protected event execution environment on the multitenant computing platform which is isolated from the first protected event execution environment; and
   initiating execution, in the second protected event execution environment, of a plurality of instructions associated with the third domain-specific event.

7. The system of claim 1, wherein determining the plurality of instructions defining a behavior of the domain object includes:

accessing code obtained from the retrieved domain object information, wherein the code is associated with domain-specific logic defined by the tenant for the domain object.

8. The system of claim 1, wherein the at least one non-transitory computer readable medium store instructions translatable by the at least one processor to implement a validation module, the validation module performing:
   obtaining, from the tenant, trait information and behavior information associated with the domain object; and
   requesting validation of the obtained trait information and behavior information, wherein the trait information defines a subset of a plurality of properties of the domain object, the subset defining a subset of properties that are changed by operations associated with the behavior of the domain object.

9. The system of claim 1, wherein the at least one non-transitory computer readable medium store instructions translatable by the at least one processor to implement one or more application programming interfaces (APIs), the one or more APIs performing:
   receiving input from the user indicating the request by the user to perform the one or more operations associated with the domain object associated with the tenant of the multitenant computing platform;
   accessing one or more domain access objects and causing the event manager to process the one or more accessed domain access objects, thereby performing the one or more operations associated with the domain object.

10. The system of claim 9, wherein the one or more AP Is further performing:
   receiving input from the user indicating the request by the user to perform the one or more operations associated with the domain object associated with the tenant of the multitenant computing platform;
   providing the first domain-specific event to the event manager.

11. A method for execution of instructions by an event manager in a multitenant environment, the method comprising:
   obtaining a first domain-specific event indicating a request by a user to perform one or more operations associated with a domain object that is associated with a tenant of the multitenant computing platform;
   determining from domain object information a plurality of instructions defining a behavior of the domain object associated with the domain-specific event;
   generating a protected event execution environment on the multitenant computing platform which implements restrictions on execution of the plurality of instructions defining the behavior of the domain object, wherein the restrictions are specific to the user and the domain object in combination;
   initiating execution, in the protected event execution environment, of the plurality of instructions defining the behavior of the domain object;
   obtaining a second domain-specific event indicating a request from a domain access object to modify the domain object information associated with the domain object in a tenant database; and
   initiating modification of the domain object information associated with the domain object in the tenant database in the protected event execution environment.

12. The method of claim 11, wherein the first domain-specific event comprises a first event published by a corresponding first domain access object indicating that the domain object will be accessed, the method further comprising accessing the first domain access object, by the user through a corresponding application programming interface (API).

13. The method of claim 12, wherein the second domain-specific event comprises a second event published by a corresponding second domain access object indicating a modification of metadata associated with the domain object, the method further comprising accessing the second domain access object by the user through a corresponding API and modifying the metadata associated with the domain object according to input provided by the user.

14. The method of claim 12, wherein the second domain-specific event comprises a second event published by a corresponding second domain access object indicating a modification of code associated with the domain object, the method further comprising accessing the second domain access object by the user through a corresponding API and modifying the code associated with the domain object according to input provided by the user.

15. The method of claim 11,
   wherein the domain object information includes a privilege mode value associated with the behavior of the domain object, wherein the method further comprises:
   when the privilege mode value is a first value indicating a non-privilege mode, validating one or more associated conditions prior to executing the plurality of instructions defining the behavior of the domain object, and
   when the privilege mode value is a second value indicating a privilege mode, executing the plurality of instructions defining the behavior of the domain object without requiring prior validation of any associated conditions.

16. The method of claim 11, wherein the user comprises a first user, the domain object comprises a first domain object, and the protected event execution environment comprises a first protected event execution environment, wherein the method further comprises:
   obtaining a third domain-specific event, wherein the third domain-specific event indicates a request to perform one or more operations associated with at least one of: a second user, and a second domain object;
   retrieving domain object information for a domain object associated with the third domain-specific event;
   generating a second protected event execution environment on the multitenant computing platform which is isolated from the first protected event execution environment; and
   initiating execution, in the second protected event execution environment, of a plurality of instructions associated with the third domain-specific event.

17. The method of claim 11, wherein determining the plurality of instructions defining a behavior of the domain object includes:
   accessing code obtained from the retrieved domain object information, wherein the code is associated with domain-specific logic defined by the tenant for the domain object.

18. The method of claim 11, further comprising:
   obtaining from the tenant, by a validation module, trait information and behavior information associated with the domain object; and
   validating, by the validation module, the obtained trait information and behavior information, wherein the trait information defines a subset of a plurality of properties of the domain object, the subset defining a subset of properties that are changed by operations associated with the behavior of the domain object.

19. The method of claim 11, further comprising:

receiving, by one or more application programming interfaces (AP Is), input from the user indicating the request by the user to perform the one or more operations associated with the domain object associated with the tenant of the multitenant computing platform;

accessing, by the one or more AP Is, one or more domain access objects and causing the event manager to process the one or more accessed domain access objects, thereby performing the one or more operations associated with the domain object.

20. A computer program product comprising a non-transitory computer-readable medium storing instructions translatable by one or more processors to execute an event manager which is configured to perform:

obtaining a first domain-specific event indicating a request by a user to perform one or more operations associated with a domain object that is associated with a tenant of the multitenant computing platform;

determining from domain object information a plurality of instructions defining a behavior of the domain object associated with the domain-specific event;

generating a protected event execution environment on the multitenant computing platform which implements restrictions on execution of the plurality of instructions defining the behavior of the domain object, wherein the restrictions are specific to the user and the domain object in combination;

initiating execution, in the protected event execution environment, of the plurality of instructions defining the behavior of the domain object;

obtaining a second domain-specific event indicating a request from a domain access object to modify the domain object information associated with the domain object in a tenant database; and initiating modification of the domain object information associated with the domain object in the tenant database in the protected event execution environment.

* * * * *